No. 619,660. Patented Feb. 14, 1899.
W. S. BLAISDELL.
WHEEL.
(Application filed May 4, 1898.)
(No Model.) 2 Sheets—Sheet 1.
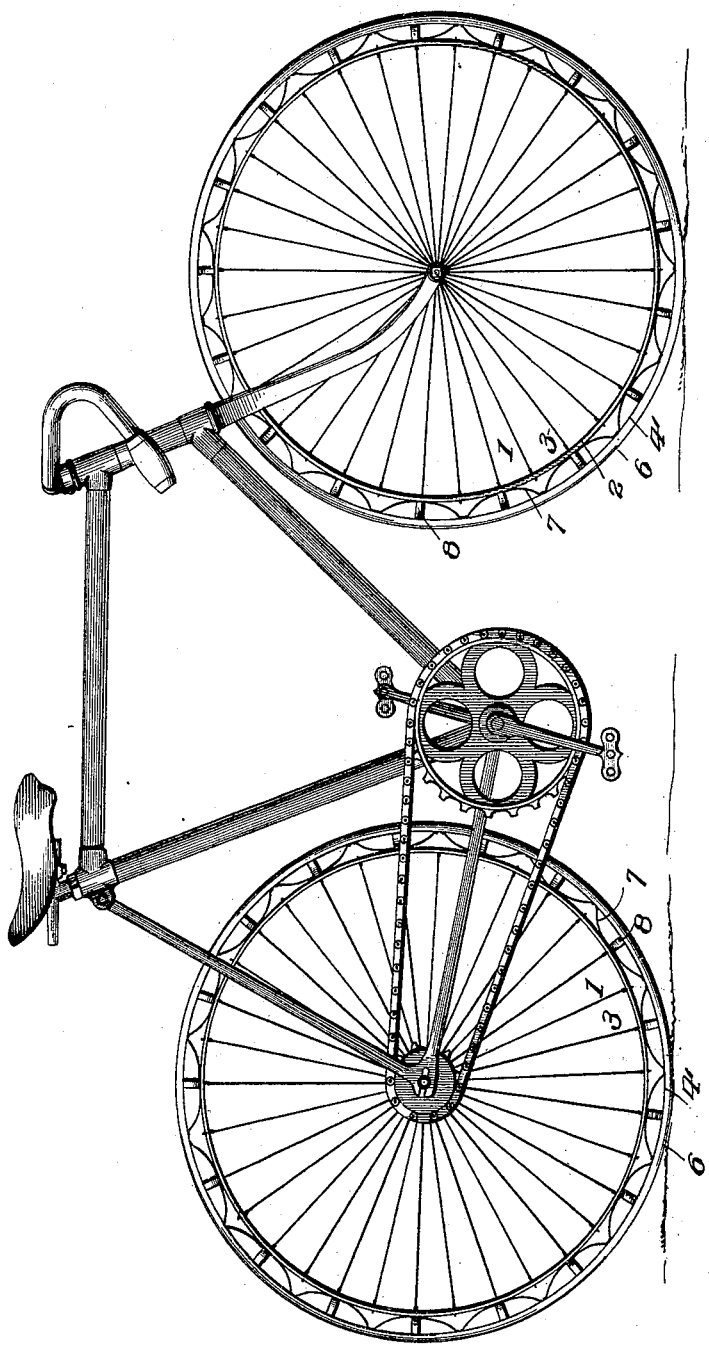
Witnesses
Inventor
William S. Blaisdell
Attorneys No. 619,660. Patented Feb. 14, 1899.
W. S. BLAISDELL.
WHEEL.
(Application filed May 4, 1898.)
(No Model.) 2 Sheets—Sheet 2.
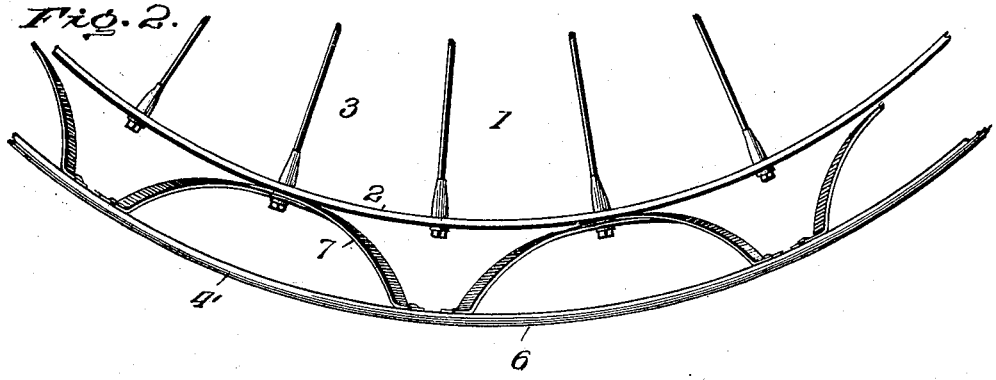
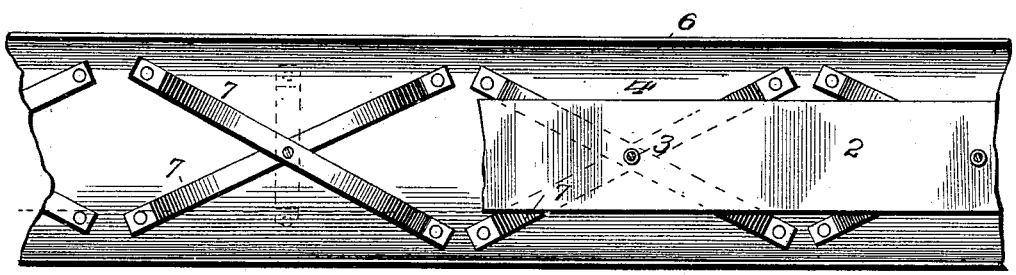
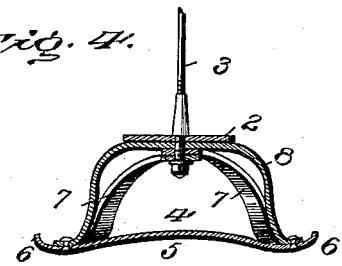
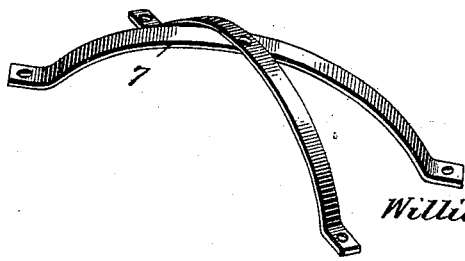
Witnesses
Chas. S. Hyer
Inventor
William S. Blaisdell
By R. S. & A. B. Lacey
Attorneys

UNITED STATES PATENT OFFICE.

WILLIAM S. BLAISDELL, OF VICTORIA, FLORIDA.

WHEEL.

SPECIFICATION forming part of Letters Patent No. 619,660, dated February 14, 1899.

Application filed May 4, 1898. Serial No. 679,718. (No model.)

*To all whom it may concern:*

Be it known that I, WILLIAM S. BLAISDELL, a citizen of the United States, residing at Victoria, in the county of Lake and State of Florida, have invented certain new and useful Improvements in Wheels; and I do hereby declare the following to be a full, clear, and exact description of the invention, such as will enable others skilled in the art to which it appertains to make and use the same.

This invention relates to wheels for bicycles and vehicles generally; and it consists, essentially, of a spring-cushion composed of a series of separate springs interposed between a rim or felly and a tire of a specific form and having a concave central portion and convex inturned edges to increase the tractive force and prevent throwing mud, particles of dirt, or stones.

The invention further consists of the construction, arrangement, and combination of parts in general and in detail, which will be more fully hereinafter described and claimed.

The object of the invention is to dispense with the use of pneumatic tires, with their well-known and obvious defects, and still retain the beneficial effect of a resilient tread and also afford such construction as will run with ease on soft, sandy, and muddy roads and permit a rider to have a more steady poise.

In the accompanying drawings, Figure 1 is a side elevation of a bicycle, showing the improvement applied thereto. Fig. 2 is a side elevation of a portion of a wheel on an enlarged scale and embodying the improvement. Fig. 3 is a top plan view of a portion of a tire and rim with the improved spring arrangement thereon. Fig. 4 is a transverse vertical section through a part of the device. Fig. 5 is a detail perspective view of one form of spring to be employed.

Referring to the drawings, wherein similar numerals of reference are used to indicate corresponding parts in the several views, the numeral 1 designates a bicycle-wheel, to which the invention is shown applied; but it will be understood that the improvement may be equally well used on vehicle-wheels generally. In the present illustration a rim 2 is provided and receives the outer ends of spokes 3. The tire 4, as more clearly shown in Fig. 4, is formed with a central concave 5 and inturned convex edges 6 and held in yielding connection with the rim 2 through the interposition of springs 7, attached to the said tire and rim and of sufficient tension to hold the tire a normal distance away from the rim. In the drawings herewith and for the purposes of practical demonstration a specific form of spring is shown and consists of a bowed-plate device of this character arranged in pairs and crossed at the center. The point of crossing of each pair of springs is engaged by one of the fastenings and in this instance is the end of one of the spokes 3, and the divergent free ends of the springs are flattened and secured by rivets or other fastenings against the inner surface of the tire. It will be observed that yielding expanding arches are thus formed at regular intervals, and while this is a very strong and excellent arrangement it is intended that other springs be employed in lieu of those specified which may be applicable to the purpose.

To prevent side lurching in heavy wheels or even at times in bicycle-wheels, a transverse spring 8 is interjected at regular intervals and also consists, preferably, of an angularly-arched flat spring secured at the center to the fastening of the arches of the crossed springs 7 and the opposite ends thereof riveted against the inner surface of the tire adjacent the edges of the latter. As shown by Figs. 2 and 3, these transverse springs can be dispensed with and the crossed springs alone be used.

In different kinds of wheels or wheels for various vehicles the tension of the springs will be increased or diminished, and all the parts will be correspondingly strengthened or made lighter.

The movement of the tire over a surface necessarily institutes or sets up a vibration which by the present arrangement is absorbed or neutralized by the springs, and the structure supported by the wheels is entirely relieved of the injury that would necessarily ensue from a continuous shock of this character, and at the same time a pleasant yielding sensation becomes apparent to the rider of a bicycle. In addition to the foregoing the benefit of a tractive advantage is derived by the non-slipping easy-bearing tire, and at times to make the said tire still more effective a rubber or analogous covering might be applied thereto and the engaging contour preserved.

The inflation, puncture, break-down, and expense of the ordinary pneumatic tire is avoided by the use of the improved device, and all the conveniences and beneficial results of such pneumatic devices are retained with materially less annoyance and more satisfactory general results.

It is obviously apparent that changes in the proportion, dimensions, and details of construction might be made and substituted for those shown and described without in the least departing from the nature or spirit of the invention or sacrificing any of the advantages thereof.

Having thus fully described my invention, what I claim as new and useful, and desire to secure by Letters Patent, is—

A wheel comprising a rim having spokes running thereto, a tire outside of and surrounding the rim, crossed arch springs interposed between and having their opposite parts secured to said rim and tire, and transverse arched springs extending over the crossed arch springs, both sets of springs having a common means of securement to the rim and the end of the transverse springs, ends also applied and attached to the inner side of the tire, substantially as described.

In testimony whereof I affix my signature in presence of two witnesses.

WILLIAM S. BLAISDELL.

Witnesses:
J. S. KIMBALL,
M. L. KIMBALL.